(12) United States Patent
Schumann et al.

(10) Patent No.: US 6,599,144 B1
(45) Date of Patent: Jul. 29, 2003

(54) SEALED TESTABLE ELECTRICAL CONTACT ARRANGEMENT

(75) Inventors: Heiko Schumann, Münster (DE); Stephan Ahlborn, Senden (DE); Harald Blomerius, Münster (DE)

(73) Assignee: Firma Ing. Walter Hengst GmbH & Co. KG, Munster (DE)

( * ) Notice: Subject to any disclaimer, the term of this patent is extended or adjusted under 35 U.S.C. 154(b) by 0 days.

(21) Appl. No.: 09/622,950

(22) PCT Filed: Nov. 18, 1999

(86) PCT No.: PCT/DE99/03710
§ 371 (c)(1),
(2), (4) Date: Oct. 16, 2000

(87) PCT Pub. No.: WO00/39898
PCT Pub. Date: Jul. 6, 2000

(30) Foreign Application Priority Data
Dec. 24, 1998 (DE) .......................... 298 23 046

(51) Int. Cl.⁷ .................. H01R 13/52; H01R 13/533
(52) U.S. Cl. ................ 439/271; 324/756; 73/46; 73/49.8; 439/219; 439/912
(58) Field of Search .................. 324/756; 73/40, 73/46, 49.8; 439/271, 219–224, 912

(56) References Cited

U.S. PATENT DOCUMENTS

| 5,596,138 A | 1/1997 | Onodera et al. ............. 73/49.2 |
| 5,625,686 A | * 4/1997 | Capper et al. ......... 379/413.04 |
| 5,703,280 A | 12/1997 | Igura et al. ..................... 73/40 |

FOREIGN PATENT DOCUMENTS

| EP | 0 327 118 A | 8/1989 |
| GB | 2 013 989 A | 8/1979 |
| GB | 2 016 216 A | 9/1979 |
| JP | 06 223917 A | 8/1994 |

* cited by examiner

Primary Examiner—Michael C. Zarroli
(74) Attorney, Agent, or Firm—Lahive & Cockfield, LLP

(57) ABSTRACT

The invention relates to an electric contact array having two contacts between which an electrically conductive connection exists, wherein the contact array is watertight and dust-tight, wherein the contacts are disposed in a sealed area. According to the invention, two sealing elements are disposed at a distance from one another in order to seal the sealed area. A test area is provided between the sealing elements, said test area having a hole that enables access from the outside.

9 Claims, 1 Drawing Sheet

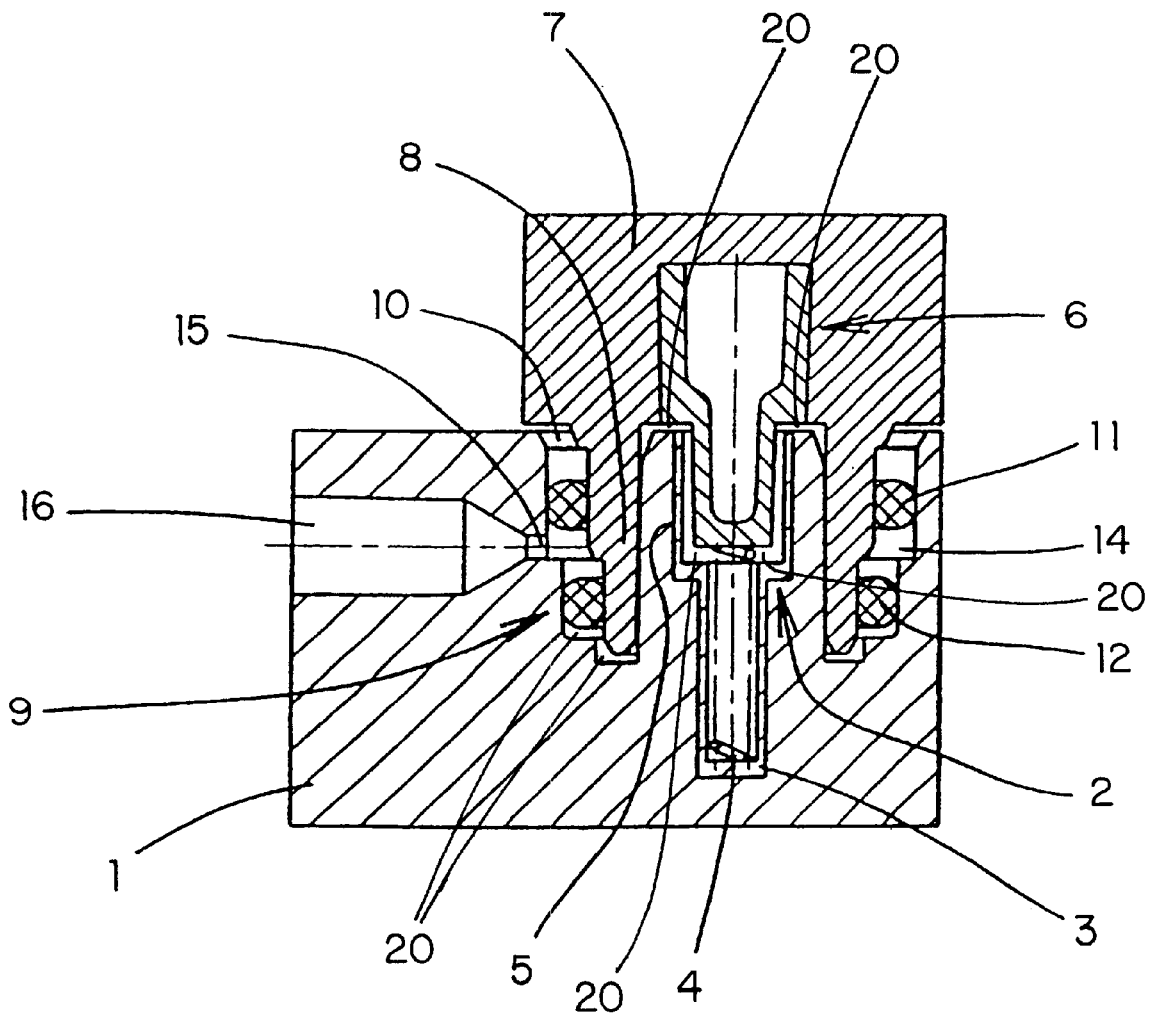

SEALED TESTABLE ELECTRICAL CONTACT ARRANGEMENT

BACKGROUND OF THE INVENTION

The invention relates to an electrical contact arrangement that is impervious to moisture and is disposed in a sealed area.

Contacts according to the species are well known in the automobile industry, for example in ignition systems. For example, the contacts between the distributor and the ignition cable, or between the ignition cable and spark plugs, are easily accessible and may be easily tested for tightness, for example by the vehicle user or by a repair shop. The seal is an essential requirement especially in the high-voltage area to ensure that there is no penetrating moisture which could cause short circuits and arcing which in turn could lead to a malfunction of the corresponding electrical system.

However, the tightness test described above is performed by separating the two contacts from one another. There is thus the disadvantage that tightness testing cannot be performed when the two contacts are in their assembled state. After the test described above, even if this test has shown previous tightness of the contact arrangement, the seal of the connection between the two components containing the two contacts may be impaired by contamination during reassembly—with the result that each tightness test itself entails the risk of creating a leak.

The tightness test described is commonly performed during a diagnostic procedure in which it is sufficient to gain the information that the contact arrangement was, for example, tight in the past and thus may be eliminated as a source of the fault. Contacts according to the species are thus unsuitable for a manufacturer, for example, who wishes to determine whether or not a contact arrangement within a deliverable module has the required seal.

The object of the invention is to improve a generic contact arrangement such that it enables reliable testing of the contact arrangement for imperviousness to dust and moisture while eliminating both damage to the sealing means and the need to open the sealed space containing the contacts for testing.

This object of the invention is achieved by the following teachings.

SUMMARY OF THE INVENTION

The invention proposes providing two sealing elements, one of which seals off the contact arrangement from the environment. A test area is created between these two sealing elements which are located a certain distance from one another, said test area being accessible from the outside. In this way, an overpressure or underpressure relative to ambient pressure may be applied in this test area. The sealing elements therefore need not be contacted during testing, with the result that any risk of damage is averted. The sealed area containing the contacts remains closed during the test.

Since the entire module, including sealing elements, remains in its assembled state, a meaningful test result is obtained; no dislocations, deformations, or other effects on the sealing elements can occur following testing.

If the applied test pressure changes, even if it does not approach the ambient pressure, it may be assumed that the inner seal is damaged, i.e. the sealing element that adjoins the space in which the two contacts are located. The change in the test pressure results from the equalization of pressure between the test area and the space in which the two contacts are located.

To ensure reliable tightness of the modules to be delivered, the detected lack of tightness may thus result in the tested module's being rejected.

Given this type of imperfect seal, the test result may indicate that at least the outer seal is sufficient since the equalization of pressure occurred only between the test area and the sealed space. If the opening of the test area accessible from outside is now sealed, for example by filling it with an adhesive or by inserting a sealing plug, the possibility of a leak through this test opening may be excluded with a high degree of probability and the entire contact arrangement may be shipped as a module which is sealed at this level of probability.

On the other hand, if, when the test pressure is applied, there is a change in pressure in which the test pressure reaches ambient pressure, it may be assumed that the external seal adjacent to the external environment is not tight. In this case, no meaningful information on the tightness of the inner seal may be obtained. To be conservative, the entire contact arrangement has to be considered not sealed, then repaired before it is once again tested and either rejected or shipped.

Each contact may be advantageously contained within its own component, the two components being plugged into each other. This approach permits a comparatively simple and cost-effective, as well as reliable design for the seals.

Here it is particularly advantageous if the plug of one component and the corresponding receptacle hole of the other component each have a round contour since it is then possible to use inexpensive, commercially available sealing rings, and it is also easier to create a reliable seal than it is with polygonal sealing contours.

Commercially available O-rings may be used to particular advantage, these O-rings being proven and reliable sealing elements, as well as inexpensive and commercially available.

An electrically conductive connection between the two contacts may be achieved simply and inexpensively by a spring, for example a compression spring, located between the two contacts and compensating for any axial play between the two components or between the two contacts. A spring designed as a helical or coil spring can, by deforming, achieve an immediate compensation in length between the two contacts, said spring always acting on the contacts at the same points. A flat spring connected electrically with the one contact and located laterally adjacent to the other contact can compensate for the axial play of the contacts even without deformation by contacting the other contact at different points. In this way, a reliable connection between the two contacts is ensured by the spring independently of manufacturing tolerances or movements during operation of the component, for example due to vibrational excitations.

One embodiment of the invention is described in more detail below based on the drawing.

Here, 1 indicates a first component which consists of an electrically insulating material, for example plastic. Within first component 1 is located first contact 2 which forms a sleeve with two sections. A lower section 3 with a smaller diameter serves to accommodate and guide compression spring 4 which is designed as a helical spring. Upper section 5 with a larger diameter accommodates second contact 6.

DESCRIPTION OF ILLUSTRATED EMBODIMENT

This second contact 6 is located in a second component 7 which also exhibits electrically insulating properties. The second contact is designed to be essentially pin-shaped and extends with a smaller-diameter section into the interior of sleeve-shaped first contact 2, the actual electrical connection between the two contacts 2 and 6 being made by compression spring 4.

As an alternative to the embodiment presented, it is of course possible to create a contact by designing spring 4 as a tension spring; however, this results in more difficult assembly since this spring would have to be attached to both contacts. As an alternative to the embodiment presented, however, a lateral flat spring may be provided within sleeve-shaped first contact 2 for example which, independently of the axial position of second contact 6, touches this contact and creates the connection between the two contacts 2 and 6. Instead of the embodiment presented, other familiar types of contact design are also conceivable.

The embodiment presented relates to the creation of a contact for applying an electrical voltage to the ionizing electrode of an electrostatic filter as used, for example, to separate oil in the crankcase housing ventilation systems of internal combustion engines, for example in the automobile industry. Here, first contact 2 may be connected by a cable, and a supporting arm may then connect to second contact 6, which supporting arm, for example, leads rearward in a manner not visible in the drawing from second component 7 and which supports the actual ionizing electrode.

It is important that contacts 2 and 6 of the contact arrangement presented remain free from contamination, especially moisture. For this purpose, second component 7 forms a plug 8 with a circular cross-section where first component 1 has a corresponding receptacle opening 9 with a matching circular cross-section to receive plug 8. The diameters of plug 8 and receptacle opening 9 are such that an annular gap 10 remains. Within this annular gap 10 at a certain distance from one another are provided two superimposed sealing elements 11 and 12 in the form of O-rings. Any motion of the two components 1 and 7 within the plane in which one of sealing elements 11 and 12 is located is prevented by a center stub which is provided on component 1, surrounds contact 2, and adjoins the inner surface of plug 8. This feature prevents any pinching of sealing elements 11 and 12, and prevents insufficient contact of sealing elements 11 and 12 with either plug 8 or receptacle opening 9.

The gap between the two sealing elements 11 and 12 creates an annular test area 14 which contains opening 15 accessible from the outside, said opening 15 connecting to test hole 16 which emerges at the exterior of first component 1.

Test hole 16 can be closed after the entire contact arrangement is assembled using a stub for which purpose a connecting means may be provided, e.g. a threaded flange not shown or a collar surrounding component 1, in order to ensure the tight fitting of the stub in test hole 16. Subsequently, test area 14 may be subjected to a special test pressure, for example, an overpressure or negative pressure introduced through the stub into test hole 16.

Specifically, a standardized test procedure may be performed in which an overpressure is created within test area 14 by producing an air-tight joint between test area 16 and a space of defined volume, then reducing the volume of this space by a defined amount, for example, by a half. If the contact arrangement is properly sealed, a specified pressure must be present in test area 14 and test hole 16, which is designated the test pressure.

A lack of change in the test pressure confirms that the two sealing elements 11 and 12 have the prescribed seal. The module shown, part of an electrostatic separator, may then be shipped as "OK" by the supplier to the automobile manufacturer or engine manufacturer.

A change in the test pressure, however without its reaching ambient pressure, indicates a leak in the area of lower sealing element 12, with the result that the pressure found in test area 14 equalizes with the pressure found in the sealed space 20 which accommodates the two contacts 2 and 6 and which is enclosed by lower sealing element 12. In addition, this test result demonstrates the proper seal for upper sealing element 11 since otherwise the test pressure would have reached ambient pressure.

The module may therefore not be shipped as "OK" but must be rejected, or test area 14 must be properly sealed off from the environment if a minimum residual probability of lack of tightness is acceptable. This tightness may be achieved, for example, by injecting adhesive into test hole 16 so that this adhesive joins with the plastic material of the first component to be airtight at a high confidence level. A possible alternative is to provide a screw thread in test hole 16 so that a sealing screw may be screwed into test hole 16 thereby sealing off said test hole 16 and test area 14 immediately behind it from the environment.

If a determination is made when the test pressure is applied to test area 14 that this test pressure undergoes significant changes and approaches ambient pressure, a lack of tightness has been established for upper sealing element 11 since a clear equalization of pressure relative to ambient atmospheric pressure has occurred. No information is gained from this test response as to the extent of the seal for lower sealing element 12, i.e., as to whether the area to be sealed containing contacts 2 and 6 has an opening or not. To be on the safe side, the entire module is not shipped as "OK" but rejected. In some cases, sealing elements 11 and 12 may be inspected and at a minimum, leaking sealing element 11 replaced—this approach then allowing the entire module to undergo a new test.

Since contacts 2 and 6 are arranged so as to be sealed within their respective components 1 and 7, there essentially exists only the possibility of leakage at the interface between said components 1 and 7. The space containing the two contacts 2 and 6 is sealed by lower sealing element 12. Upper sealing element 11 provides added security against leaks as long as test area 14 is sealed tight.

The contact arrangement presented has the advantage that testing for proper seal may be performed on the completely assembled module without jeopardizing the seal of sealing elements 11 or 12. This aspect is also especially advantageous for the customer performing quality controls, e.g. if the modules must be shipped over longer routes and the buyer wishes to conduct at least spot checking of the modules for their proper seal. In the standard design which provides for the seal via sealing elements 11 and 12, the proposed design is also especially reliable and operationally reliable due to the double seal as long as test hole 16 and test area 14 remain tightly sealed.

What is claimed is:

1. Electrical contact arrangement with two contacts between which an electrically conducting exists, the contact arrangement being impervious to moisture and dust, and the contacts being arranged in a sealed space, said arrangement comprising two sealing elements located a certain distance from one another, and a test area being created between said sealing elements and distinct from said sealed space, said test area having an opening accessible from the outside.

2. Contact arrangement according to claim 1, wherein said sealing elements comprise O-rings.

3. Contact arrangement according to claim 1, further comprising two components each component having one of the two contacts, wherein the two components are fixed to prevent movement relative to one another in a plane in which one of the two sealing elements are located.

4. Contact arrangement according to claim 1, further comprising two components each having one of two contacts, wherein one of said components includes a plug and the other component includes a receptacle opening for the plug, wherein an annular gap is created between an outer surface of the plug and an inner surface of the receptacle opening, wherein said two sealing elements are located within said annular gap.

5. Contact arrangement according to claim 4, wherein the plug and the receptacle opening have a round contour.

6. Contact arrangement according to claim 4, further comprising an elastic spring located between the two contacts, said spring compensating for axial play between the two contacts.

7. Electrical contact arrangement with two contacts between which an electrically conducting connection exists, the contact arrangement being impervious to moisture and dust, and the contacts being arranged in a sealed space, said arrangement comprising:

two sealing elements located a certain distance form one another, and a test area being created between said sealing elements, said test area having an opening accessible from the outside; and two components each having one of two contacts, wherein one of said components includes a plug and the other component includes a receptacle opening for the plug, wherein an annular gap is created between an outer surface of the plug and an inner surface of the receptacle opening, wherein said two sealing elements are located within said annular gap.

8. Contact arrangement according to claim 7, wherein the plug and the receptacle opening have a round contour.

9. Contact arrangement according to claim 7, further comprising an elastic spring located between the two contacts, said spring compensating for axial play between the two contacts.

* * * * *